US012712685B2

(12) United States Patent
Wu

(10) Patent No.: US 12,712,685 B2
(45) Date of Patent: Aug. 18, 2026

(54) METHOD AND RADIO ACCESS NETWORK NODE FOR ALLOCATING RESOURCES FOR AN APERIODIC SOUNDING REFERENCE SIGNAL

(71) Applicant: Telefonaktiebolaget LM Ericsson (publ), Stockholm (SE)

(72) Inventor: Ping Wu, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 335 days.

(21) Appl. No.: 18/693,963

(22) PCT Filed: Sep. 21, 2021

(86) PCT No.: PCT/SE2021/050908

§ 371 (c)(1),
(2) Date: Mar. 21, 2024

(87) PCT Pub. No.: WO2023/048603

PCT Pub. Date: Mar. 30, 2023

(65) Prior Publication Data

US 2024/0388392 A1 Nov. 21, 2024

(51) Int. Cl.
*H04L 5/00* (2006.01)
*H04W 72/0446* (2023.01)
*H04W 72/1273* (2023.01)

(52) U.S. Cl.
CPC .......... *H04L 5/0037* (2013.01); *H04L 5/0048* (2013.01); *H04W 72/0446* (2013.01); *H04W 72/1273* (2013.01); *H04L 5/0003* (2013.01)

(58) Field of Classification Search
CPC ...................... H04W 72/0446; H04W 72/1273
See application file for complete search history.

(56) References Cited

U.S. PATENT DOCUMENTS

2019/0215110 A1 7/2019 Yang et al.
2020/0112970 A1 4/2020 Manolakos et al.
(Continued)

FOREIGN PATENT DOCUMENTS

WO 2020101780 A2 5/2020
WO 2020144896 A1 7/2020

OTHER PUBLICATIONS

International Search Report and Written Opinion of the International Searching Authority, PCT/SE2021/050908, mailed May 20, 2022, 12 pages.

(Continued)

*Primary Examiner* — Wayne H Cai
(74) *Attorney, Agent, or Firm* — Sage Patent Group

(57) ABSTRACT

Disclosed is a method that is performed by a network node of a Radio Access Network, RAN, for allocating resources for an APeriodic Sounding Reference Signal, AP-SRS, the method including: creating a multiple dimension resource map for SRS resources, wherein each SRS resource index having a corresponding count, indicating the allocated amount of corresponding SRS resource index; counting the number of the allocated SRS resources for each downlink slot; selecting the downlink slot which has the minimum number of allocated SRS resources; counting the number of the allocated resources for each SRS slot; selecting the SRS slot which has the minimum allocated SRS resources; determining a valid SRS resource index or indexes with minimum allocated amount, for the selected downlink slot and SRS slot, based on 1-symbol or multi-symbol SRS user; allocating SRS resource having the valid SRS resource index or indexes.

20 Claims, 6 Drawing Sheets

(56) References Cited

U.S. PATENT DOCUMENTS

| | | | | |
|---|---|---|---|---|
| 2020/0280465 | A1 | 9/2020 | Kim et al. | |
| 2021/0400696 | A1 | 12/2021 | Maki et al. | |
| 2024/0049193 | A1* | 2/2024 | Abdelghaffar | H04W 76/20 |
| 2024/0171352 | A1* | 5/2024 | Wang | H04L 5/0051 |

OTHER PUBLICATIONS

ZTE, "Enhancements on SRS flexibility, coverage and capacity," 3GPP TSG RAN WG1 Meeting #106-e, R1-2106546, e-Meeting, Aug. 16-27, 2021, 12 pages.

Futurewei, "Enhancements on SRS flexibility, coverage and capacity," 3GPP TSG RAN WG1 Meeting #106-e, R1-2107083, eMeeting, Aug. 16-27, 2021, 32 pages.

European Search Report and Opinion for European Patent Application No. 21958525.4 dated Apr. 4, 2025, 8 pages.

CATT, "Discussion on SRS enhancement for Rel-17," R1-2100348, 3GPP TSG RAN WG1 #104-e, e-Meeting, Jan. 25-Feb. 5, 2021, 17 pages.

* cited by examiner 100
150
130
140
145

SRS slot 0 – Dl slot 0

| index | 0 | 1 | 2 | 3 | 4 | 5 | 6 | ... | 41 | 42 | 43 | 44 | 45 | 46 | 47 |
|---|---|---|---|---|---|---|---|---|---|---|---|---|---|---|---|
| count | 2 | 0 | 3 | 0 | 0 | 0 | 0 | ... | 0 | 0 | 0 | 3 | 0 | 0 | 0 |

SRS slot 0 – Dl slot 1

| index | 0 | 1 | 2 | 3 | 4 | 5 | 6 | ... | 41 | 42 | 43 | 44 | 45 | 46 | 47 |
|---|---|---|---|---|---|---|---|---|---|---|---|---|---|---|---|
| count | 0 | 0 | 0 | 1 | 0 | 2 | 0 | ... | 0 | 0 | 0 | 2 | 0 | 0 | 0 |

SRS slot 0 – Dl slot 2

| index | 0 | 1 | 2 | 3 | 4 | 5 | 6 | ... | 41 | 42 | 43 | 44 | 45 | 46 | 47 |
|---|---|---|---|---|---|---|---|---|---|---|---|---|---|---|---|
| count | 0 | 0 | 0 | 0 | 0 | 0 | 1 | ... | 0 | 0 | 0 | 0 | 0 | 0 | 1 |

SRS slot 0 – Dl slot 3

| index | 0 | 1 | 2 | 3 | 4 | 5 | 6 | ... | 41 | 42 | 43 | 44 | 45 | 46 | 47 |
|---|---|---|---|---|---|---|---|---|---|---|---|---|---|---|---|
| count | 0 | 0 | 0 | 0 | 0 | 0 | 0 | ... | 0 | 0 | 0 | 0 | 0 | 0 | 0 |

SRS slot 1 – Dl slot 0

| index | 0 | 1 | 2 | 3 | 4 | 5 | 6 | ... | 41 | 42 | 43 | 44 | 45 | 46 | 47 |
|---|---|---|---|---|---|---|---|---|---|---|---|---|---|---|---|
| count | 0 | 0 | 2 | 0 | 0 | 0 | 3 | ... | 0 | 0 | 0 | 0 | 2 | 0 | 0 |

SRS slot 1 – Dl slot 1

| index | 0 | 1 | 2 | 3 | 4 | 5 | 6 | ... | 41 | 42 | 43 | 44 | 45 | 46 | 47 |
|---|---|---|---|---|---|---|---|---|---|---|---|---|---|---|---|
| count | 1 | 0 | 0 | 0 | 0 | 2 | 0 | ... | 0 | 0 | 0 | 0 | 0 | 1 | 0 |

SRS slot 1 – Dl slot 2

| index | 0 | 1 | 2 | 3 | 4 | 5 | 6 | ... | 41 | 42 | 43 | 44 | 45 | 46 | 47 |
|---|---|---|---|---|---|---|---|---|---|---|---|---|---|---|---|
| count | 0 | 0 | 0 | 0 | 0 | 0 | 0 | ... | 0 | 0 | 0 | 0 | 0 | 0 | 1 |

SRS slot 1 – Dl slot 3

| index | 0 | 1 | 2 | 3 | 4 | 5 | 6 | ... | 41 | 42 | 43 | 44 | 45 | 46 | 47 |
|---|---|---|---|---|---|---|---|---|---|---|---|---|---|---|---|
| count | 0 | 0 | 0 | 0 | 0 | 0 | 0 | ... | 0 | 0 | 0 | 0 | 0 | 0 | 1 |

METHOD AND RADIO ACCESS NETWORK NODE FOR ALLOCATING RESOURCES FOR AN APERIODIC SOUNDING REFERENCE SIGNAL

CROSS REFERENCE TO RELATED APPLICATIONS

This application is a 35 U.S.C. § 371 national stage application of PCT International Application No. PCT/SE2021/050908 filed on Sep. 21, 2021, the disclosure and content of which is incorporated by reference herein in its entirety.

TECHNICAL FIELD

The present disclosure relates generally to a method and a network node of a Radio Access Network, RAN, for allocating resources for an APeriodic Sounding Reference Signal (AP-SRS) in a wireless communication network. The present disclosure further relates to a computer program and a carrier containing the computer program, which when executed performs the method.

BACKGROUND

To meet the huge demand for higher bandwidth, higher data rates and higher network capacity, due to e.g., data centric applications, existing 4$^{th}$ Generation (4G) wireless communication network technology, aka Long Term Evolution (LTE) is being extended or enhanced into a 5$^{th}$ Generation (5G) technology, also called New Radio (NR) access. The following are requirements for 5G wireless communication networks:

- Data rates of several tens of megabits per second should be supported for tens of thousands of users;
- 1 gigabit per second is to be offered simultaneously to tens of workers on the same office floor;
- Several hundreds of thousands of simultaneous connections are to be supported for massive sensor deployments;
- Spectral efficiency should be significantly enhanced compared to 4G;
- Coverage should be improved;
- Signaling efficiency should be enhanced; and
- Latency should be reduced significantly compared to 4G.

Massive Multiple Input Multiple Output (MIMO) is the most important technology in both LTE and NR because of its remarkable spatial multiplexing gain and powerful interference cancelation ability.

For single user (SU) and multiple user (MU) downlink MIMO, channel reciprocity is utilized to calculate SU or MU downlink beamforming weight, which can suppress both the intra-cell and inter-cell interferences.

In terms of channel reciprocity utilization, a sounding reference signal (SRS) is the key uplink resource to be used for SU and MU downlink beamforming. The SRS is a reference signal transmitted by the UE in the uplink direction which is used by the eNB or gNB to estimate the uplink channel quality over a wider bandwidth. Due to channel reciprocity, the estimated channel quality can also be applied to the downlink channel.

There are 3 different types of SRS, i.e., periodic SRS (P-SRS), semi-persistent SRS (SP-SRS) and aperiodic SRS (AP-SRS). The P-SRS is configured by RRC message, then UE periodically sends SRS without further triggering, which is the most static type. The SP-SRS is configured by RRC message, then eNB or gNB activates or deactivates the SP-SRS by a Media Access Control (MAC) control element. UE will send the SP-SRS periodically if it is activated and stop sending SP-SRS after deactivation command being received. SP-SRS is more flexible than P-SRS.

AP-SRS is even more dynamic than SP-SRS and P-SRS because it is configured by a Radio Resource Control (RRC) message and triggered by a Downlink Control Indicator (DCI) on demand.

FIG. 1 shows a typical message sequence chart for AP-SRS configuration and triggering, i.e., from a network node to a wireless device, called gNode B (gNB) 10 and a User Equipment (UE) 20, respectively, in 5G networks. The gNB 10 performs 1.1 an AP-SRS configuration procedure, which allocates a radio resource for AP-SRS. When the configuration is completed, the gNB 10 transmits 1.2 an RRC message to the UE 20. The RRC message comprises the configuration result, i.e., the indicator for the allocated radio resource for AP-SRS. The UE 20 receives and saves the RRC message but does not send AP-SRS immediately. The gNB 10 then transmits 1.3 a DCI to the UE 20 for triggering the AP-SRS procedure. The UE 20 is triggered and send 1.4 an AP-SRS to the gNB 10 according to the received configuration in step 1.2, i.e., the AP-SRS is sent based on the radio resource being comprised in the 1.2 RRC configuration message.

Considering the AP-SRS configuration, a specific configuration method for AP-SRS is necessary. There are two ways to provide an AP-SRS configuration method, one is to apply the existing SRS configuration method to AP-SRS, the other is to develop a new configuration method especially for AP-SRS.

The existing technology of the P-SRS configuration algorithm cannot be used for the AP-SRS, because the standard of the P-SRS is different from the standard of the AP-SRS, including a different SRS resource set, different allowance of SRS slots, and different triggering behavior.

Thus, there is a need for a configuration method for the AP-SRS, such that a network node can configure proper radio resources to the UE and the UE can be successfully triggered and send the corresponding AP-SRS based on the configured AP-SRS resources.

SUMMARY

It is an object of the invention to address at least some of the problems and issues outlined above. It is possible to achieve these objects and others by using the method, network node and wireless communication devices as defined in the attached independent claims.

According to one aspect, a method is provided that is performed by a network node of a Radio Access Network, RAN, for allocating resources for an APeriodic Sounding Reference Signal, AP-SRS, the RAN comprising the network node and at least one User Equipment, UE, the method comprising: creating a multiple dimension resource map for SRS resources, such as downlink slots, SRS slots and SRS resource indexes, wherein each SRS resource index having a corresponding count, indicating the allocated amount of corresponding SRS resource index; counting the number of the allocated SRS resources for each downlink slot, across all the SRS slots; selecting the downlink slot which has the minimum number of allocated SRS resources, across all the SRS slots; counting the number of the allocated resources for each SRS slot, across all the downlink slots for each SRS slot, respectively; selecting the SRS slot which has the minimum allocated SRS resources; determining a valid SRS resource index or indexes with minimum allocated amount, for the selected downlink slot and SRS slot, based on 1-symbol or multi-symbol SRS user; allocating SRS resource having the valid SRS resource index or indexes.

According to another aspect, a network node operable in a Radio Access Network, RAN, and configured for allocating resources for an APeriodic Sounding Reference Signal, AP-SRS, the network node comprising multiple antennas, a processing circuitry and a memory, said memory containing instructions which when executed by the processing circuitry cause the network node to: create a multiple dimension resource map for SRS resources, such as downlink slots, SRS slots and SRS resource indexes, wherein each SRS resource index having a corresponding count, indicating the allocated amount of corresponding SRS resource index; count the number of the allocated SRS resources for each downlink slot, across all the SRS slots; select the downlink slot which has the minimum number of allocated SRS resources, across all the SRS slots; count the number of the allocated resources for each SRS slot, across all the downlink slots for each SRS slot, respectively; select the SRS slot which has the minimum allocated SRS resources; determine a valid SRS resource index or indexes with minimum allocated amount, for the selected downlink slot and SRS slot, based on 1-symbol or multi-symbol SRS user; allocating the SRS resource having the valid SRS resource index or indexes.

According to other aspects, a computer program and a carrier are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figures 1, 2:
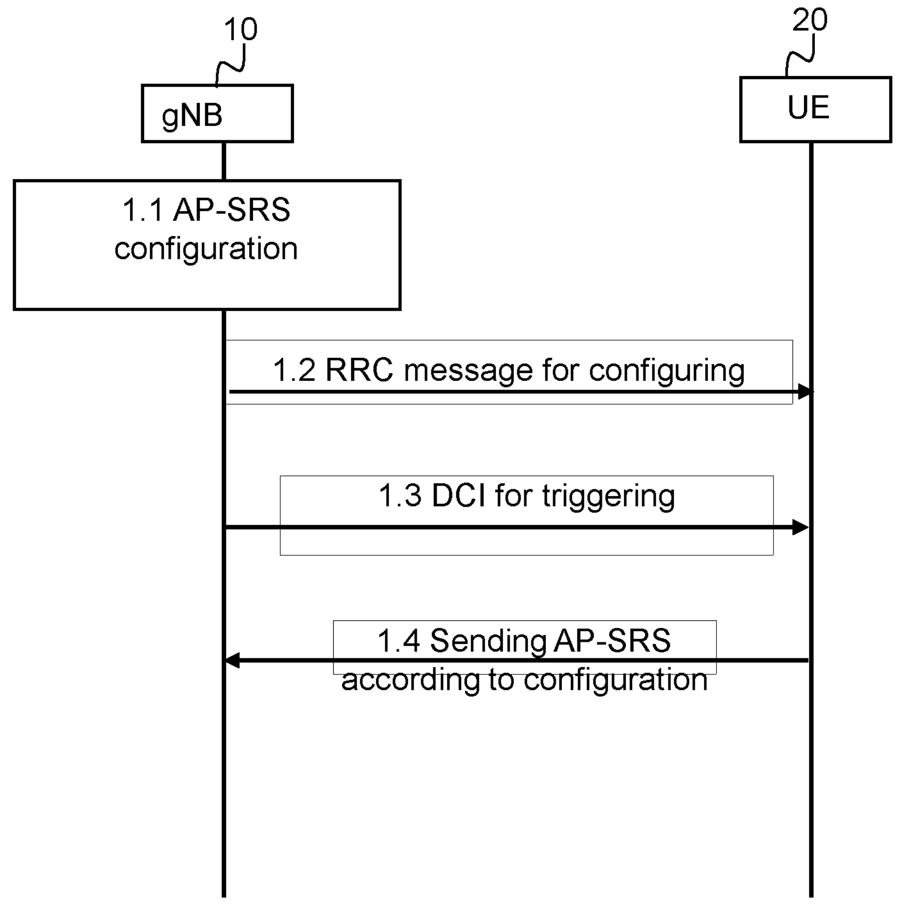
FIG. 1 is a signaling diagram of an AP-SRS sequence between a network node and a device.
FIG. 2 is a schematic block diagram of a radio access network in which the present invention may be implemented.

FIG. 2 shows a radio access network 100 comprising a network node 130 that is in, or is adapted for, wireless communication with a number of wireless devices 140, 145, i.e., UEs. The network node 130 provides radio coverage in a cell 150, which is a geographical area. A number of wireless devices 140, 145 reside in the cell 150.

The radio access network 100 may be any kind of wireless communication network that can provide radio access to wireless communication devices. Example of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE) Frequency Division Duplex (FDD) and Time Division Duplex (TDD), LTE Advanced, Wireless Local Area Networks (WLAN), Worldwide Interoperability for Microwave Access (WiMAX), WiMAX Advanced, as well as 5G wireless communication networks based on technology such as New Radio (NR). However, the embodiments of the following detailed description are described for NR.

The network node 130 may be any kind of network node that provides wireless access to the number of wireless devices 140, 145 alone or in combination with another network node. The network node may also be called radio network node. Examples of a network node 130 are a base station (BS), a radio BS, a base transceiver station, a BS controller, a network controller, a Node B (NB), an evolved Node B (eNB), a gNodeB (gNB), a Multi-cell/multicast Coordination Entity, a relay node, an access point (AP), a radio AP, a remote radio unit (RRU), a remote radio head (RRH), nodes in a distributed antenna system (DAS) and a multi-standard radio BS (MSR BS).

The wireless devices 140, 145 may be any type of device capable of wirelessly communicating with a radio access network node 130 using radio signals. The wireless devices may also be called wireless communication devices or simply devices in this disclosure. For example, the wireless devices 140, 145 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

The embodiments described herein may be applicable to single carrier as well as to multicarrier (MC) or carrier aggregation (CA) operation of the wireless devices. The term carrier aggregation (CA) may also be called multi-carrier system, multi-cell operation, multi-carrier operation, and multi-carrier transmission and/or reception. The embodiments may equally apply for Multi radio bearers (RAB) on some carriers, which means that data and speech are simultaneously scheduled.

In 5G NR, many different types of SRS resources exist in the network in terms of UE capability which have different configuration patterns, e.g., 1 transmitter, 2 receivers (1T2R), 1 transmitter 4 receivers (1T4R), 2 transmitters 2 receivers (2T2R), 4 transmitters 4 receivers (4T4R) etc. In addition, the network may have different number of SRS slots and different users may have different SRS slot offsets to trigger its own AP-SRS.

Figure 3:
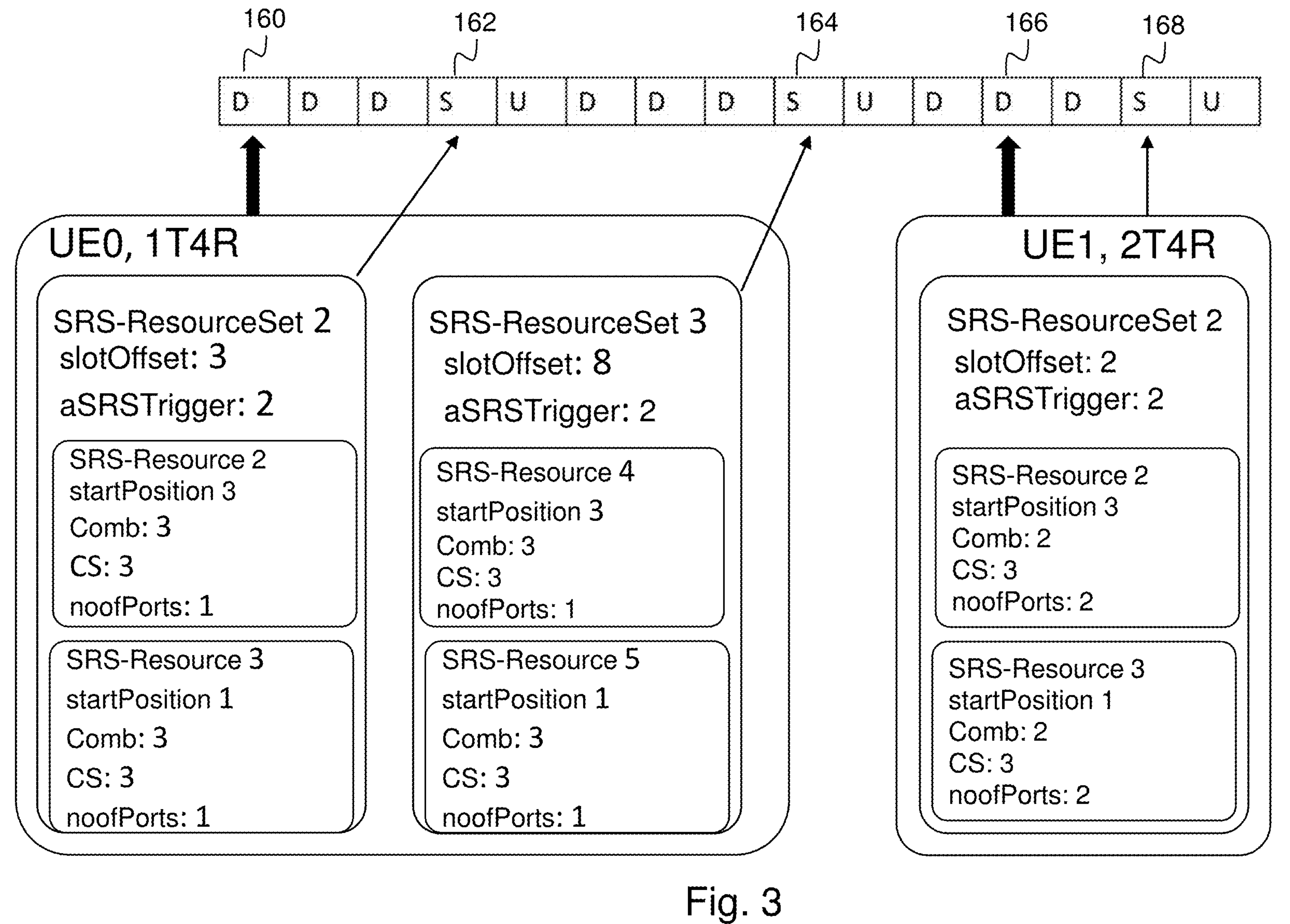
FIG. 3 is a schematic block diagram in more detail of an example of an AP-SRS configuration.

FIG. 3 discloses a schematic block diagram in more detail of an exemplary AP-SRS configuration. For AP-SRS configuration, an AP-SRS resource set mainly includes:

- a slotOffset, which is the slot offset between the triggering TTI and the SRS sending TTI,
- a list of SRS resources which depend on the UE capability and wherein each SRS resource has its own resource components:
  - Symbol, i.e., the startPosition and the number of symbols
  - Comb, i.e., the comb offset to specify which subcarriers are used
  - Cyclic shift, to generate pseudo-orthogonal SRS sequences by configuring different cyclic shifts Number of SRS port, i.e., number of antenna ports to send this SRS resource The slots marked with "D" are downlink slots, the slots marked with "U" or "S" are potential SRS slots, but the example in FIG. 3 only uses "S" slot as SRS slots. As FIG. 3 shows, for the 1T4R UE0, the triggering TTI is sent in the downlink slot 160 from the network node 130 and the AP-SRS is sent by UE0 in SRS slots 162 and 164 since the configured slot offset is 3 and 8 from the downlink slot 160. The other allocated AP-SRS resources are shown in FIG. 3. Similarly, for the 2T4R UE1, the triggering TTI is sent in the downlink slot 166 and the AP-SRS is sent in the SRS slot 168 since the slot offset is 2 from the downlink slot 166. For AP-SRS triggering in NR as example, DCI1_1, DCI 0_1 or DCI 2_3 can be used to trigger the AP-SRS if the TTI is the correct SRS triggering slot in terms of the slot offset.

Figure 4:
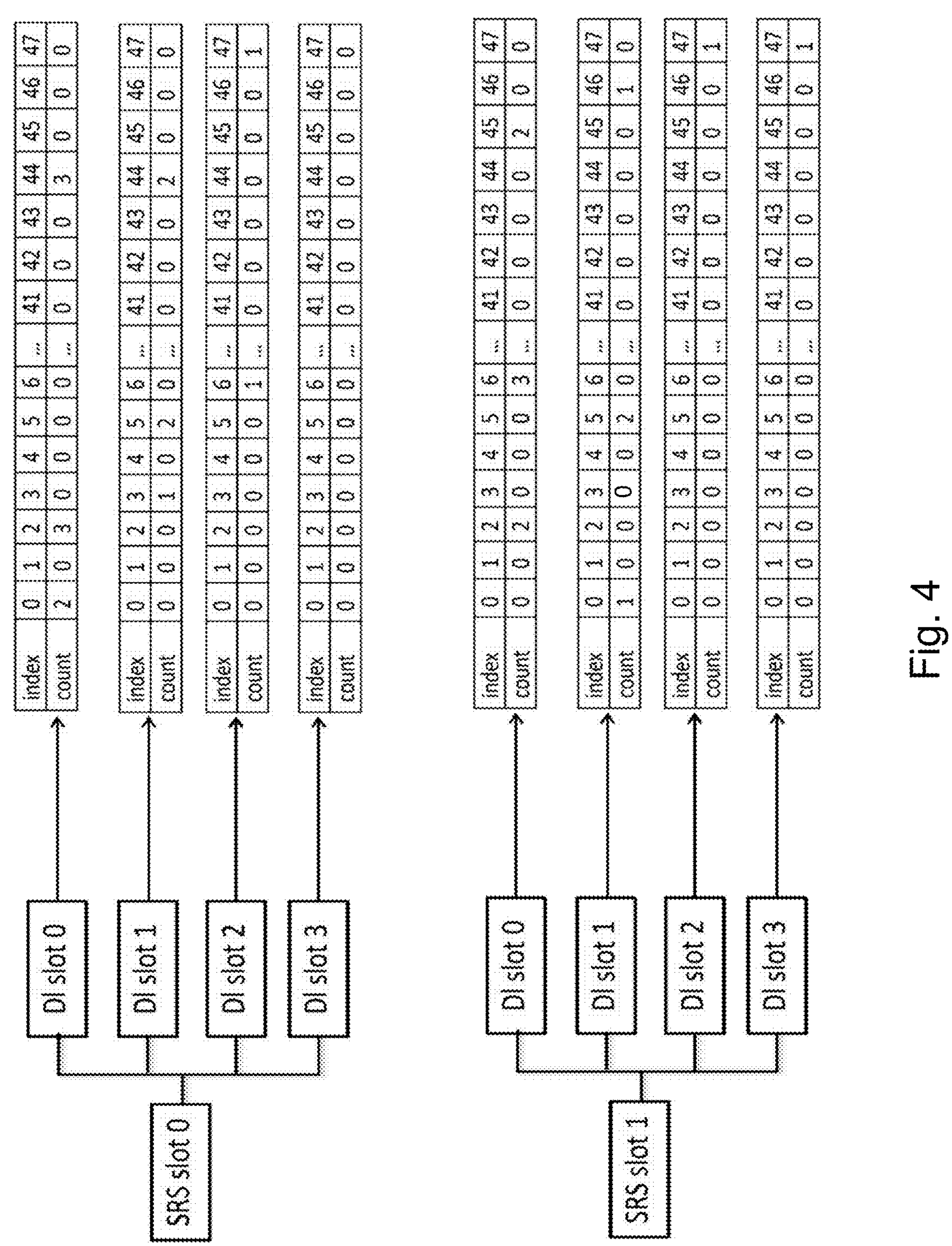
FIG. 4 is a schematic block diagram of an example of an AP-SRS resource map.

FIG. 4 discloses an example of the AP-SRS resource map. The multiple dimension AP-SRS resources include downlink slots, SRS slots, SRS resource indexes, which are mapped to SRS symbols, SRS hops, SRS combs, SRS cyclic shifts).

For the AP-SRS resource components of symbol, hop, comb, cyclic shift, these resources are mapped to a resource index to make the allocation easier. An example of such mapping is: 3 symbols, 1 hop, 4 combs and 4 cyclic shifts, i.e., a total 3×1×4×4=48 resource indexes are shown in the table below:

| Hop, comb, cyclic shift | Symbol 0 | Symbol 1 | Symbol 2 |
|---|---|---|---|
| hop0, cb3, cs3 | 0 | 1 | 2 |
| hop0, cb2, cs3 | 3 | 4 | 5 |
| hop0, cb1, cs3 | 6 | 7 | 8 |
| hop0, cb0, cs3 | 9 | 10 | 11 |
| hop0, cb3, cs2 | 12 | 13 | 14 |
| . . . | . . . | . . . | . . . |
| hop0, cb0, cs1 | 33 | 34 | 35 |
| hop0, cb3, cs0 | 36 | 37 | 38 |
| hop0, cb2, cs0 | 39 | 40 | 41 |
| hop0, cb1, cs0 | 42 | 43 | 44 |
| hop0, cb0, cs0 | 45 | 46 | 47 |

The order in the above example is in descending order, any other mapping orders like ascending order or random order are also applicable.

As mentioned above, FIG. 4 shows a schematic block diagram of an example of the AP-SRS resource map. Two SRS slots, SRS slot 0 and SRS slot 1 are shown in the example, corresponding to SRS slots 162 and 164 in FIG. 3.

As FIG. 4 shows, every SRS slot comprises one or more downlink slots, i.e., 4 downlink slots, from DI slot 0 to DI slot 3. Each DI slot comprises one or more indexes, i.e., 48 indexes, which is corresponding to the table above. Each index has its corresponding count, the count indicates the allocated resource number of the corresponding index.

Figure 5:
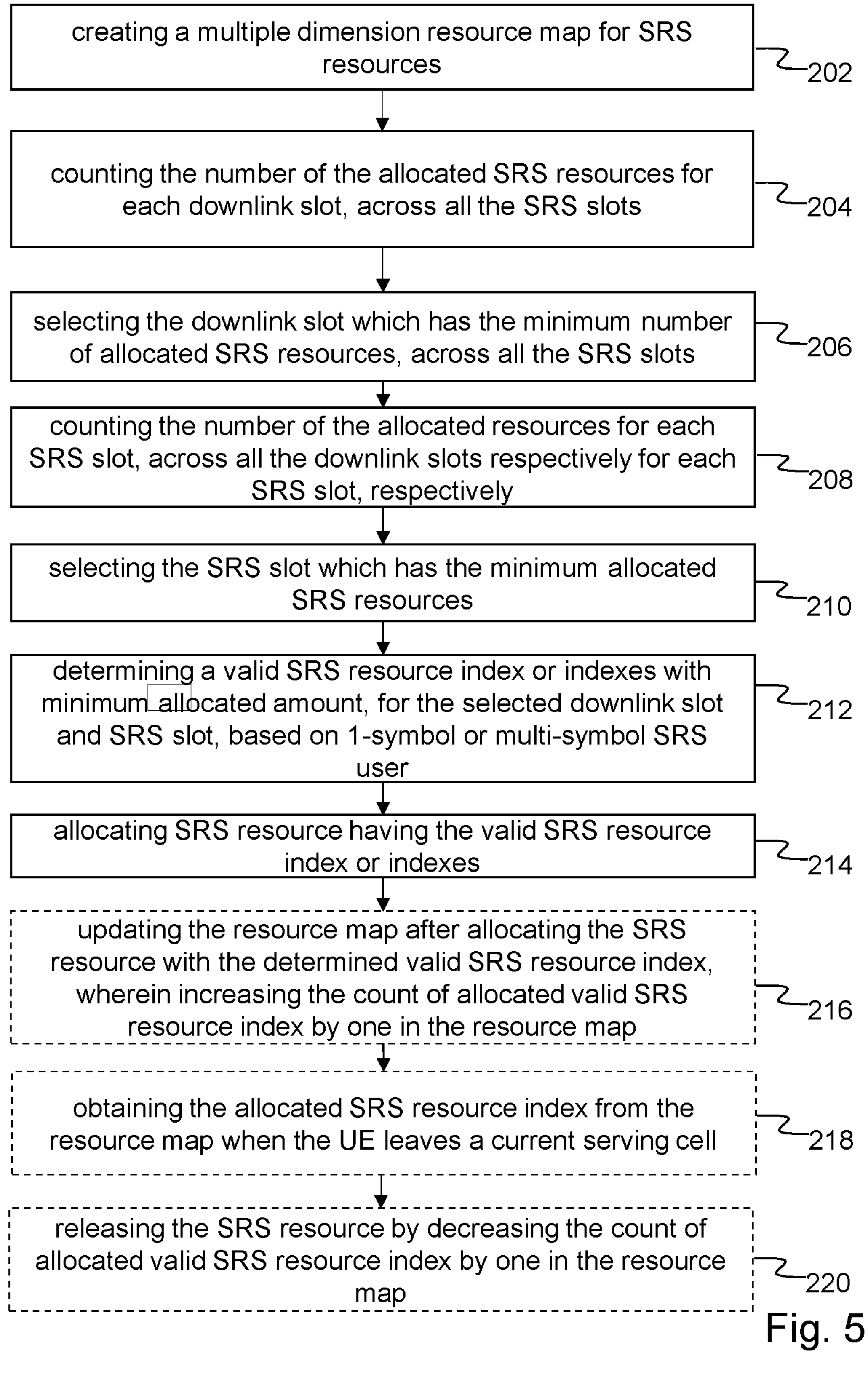
FIG. 5 is a flow chart illustrating a method performed by a network node, according to exemplary embodiments.

FIG. 5, in conjunction with FIG. 4, describes a method performed by the network node 130 of the RAN 100. The method comprises: creating 202 a multiple dimension resource map for SRS resources, such as downlink slots, SRS slots and SRS resource indexes, wherein each SRS resource index having a corresponding count, indicating the allocated amount of corresponding SRS resource index; counting 204 the number of the allocated SRS resources for each downlink slot, across all the SRS slots; selecting 206 the downlink slot which has the minimum number of allocated SRS resources, across all the SRS slots; counting 208 the number of the allocated resources for each SRS slot, across all the downlink slots for each SRS slot, respectively, selecting 210 the SRS slot which has the minimum allocated SRS resources; determining 212 a valid SRS resource index or indexes with minimum allocated amount, for the selected downlink slot and SRS slot, based on a 1-symbol or multi-symbol SRS user; allocating 214 the SRS resource having the valid SRS resource index or indexes.

The multiple dimension resource map for SRS resources created in step 202 may for example a resource map as shown in FIG. 4. In step 204, across SRS slot 0 and 1, the number of the allocated SRS resources is counted for each downlink slot. In step 206, the downlink slot which has the minimum number of allocated SRS resources, across SRS slot 0 and 1, is selected. For example, for each of DI slots 0-3, all the allocated SRS resources indicated by counts are counted, across SRS slot 0 and 1. For DI slot 0 across SRS slot 0 and 1, the number of allocated SRS resources is 15. This number is calculated by adding all the counts in DI slot 0, across SRS slot 0 and 1 (for the sake of illustration, the numbers in the ellipses are disregarded): 2+3+3 (in SRS slot 0)+2+3+2 (in SRS slot 1)=15. Similarly, for DI slot 1, the number of allocated SRS resources is: 1+2+2 (in SRS slot 0)+1+2+1 (in SRS slot 1)=9. For DI slot 2, the number of allocated SRS resource is: 1+1 (in SRS slot 0)+1 (in SRS slot 1)=3. For DI slot 3, the number of allocated SRS resources is: 0 (in SRS slot 0)+1 (in SRS slot 1)=1. Thus, DI slot 3 is selected because DI slot 3 has the minimum number 1 of allocated SRS resources, across SRS slot 0 and 1. In step 208, the number of the allocated resources for each SRS slot, i.e., SRS slot 0 and 1, is counted, across all the downlink slots respectively for each SRS slot. In step 210, the SRS slot which has the minimum allocated SRS resources is selected. For example, across all its DI slots, the number of the allocated resources of SRS slot 0 is 2+3+3 (in DI slot 0)+1+2+2 (in DI slot 1)+1+1 (in DI slot 2)+0 (in DI slot 3)=15. Similarly, across all its DI slots, the number of the allocated resources of SRS slot 1 is 2+3+2 (in DI slot 0)+1+2+1 (in DI slot 1)+1 (in DI slot 2)+1 (in DI slot 3)=13. Thus, SRS slot 1 is selected because this slot has the minimum number 13 of allocated SRS resources, across all the DI slots of its own. In step 212, determine a valid SRS resource index or indexes with minimum allocated amount, for the selected downlink slot and SRS slot, based on 1-symbol or multi-symbol SRS user. According to the example above, the indexes in SRS slot 1, DI slot 3 are considered. The index 0 in the SRS slot 1, DI slot 3 is determined as a valid SRS resource. In step 214, allocate SRS resource having the valid SRS resource index or indexes. In this example, SRS resource having index 0 in SRS slot 1 DI slot 3 is allocated.

By such a method, the AP-SRS resources can be allocated to the users to minimize the AP-SRS resource conflict in the network. The AP-SRS will be allocated to the network users averagely, distributed over the downlink slots and SRS slots. The SRS resource components are averagely allocated as well. As a result, the network SRS resource conflict can be well avoided. For example, if UE1 is assigned as downlink slot 0, SRS slot 0, SRS resource index 0, then UE2 will be assigned as downlink slot 1, SRS slot 1 and SRS resource index 1. Thus, they will be triggered in different downlink slots, sent in different SRS slots, and using different resource components.

According to an exemplary embodiment, steps 204, 206 and steps 208, 210 can be performed in parallel, thus the downlink slot and the SRS slot can be selected in parallel.

Figure 6:
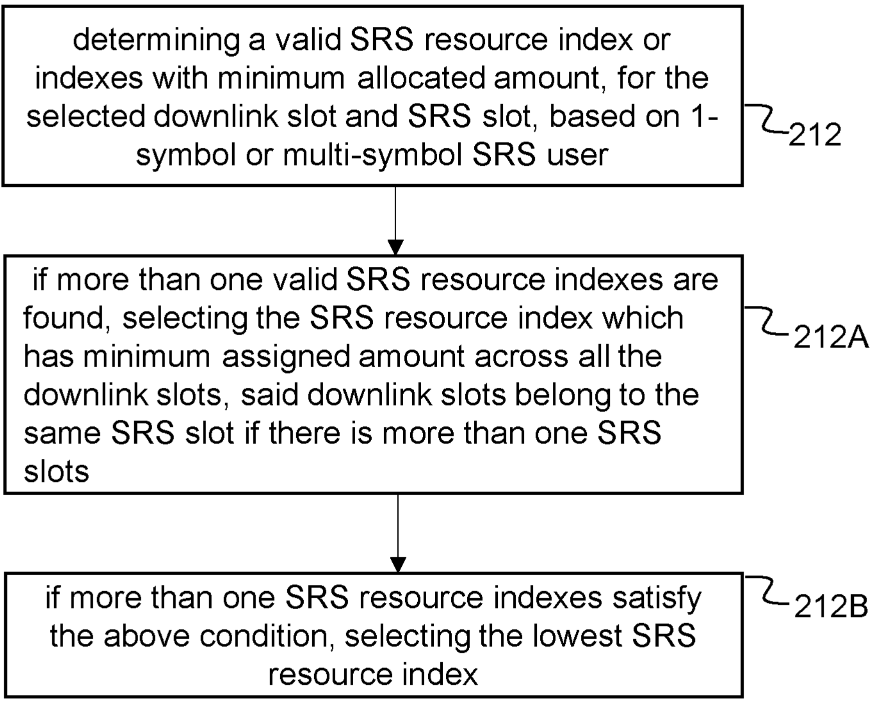
FIG. 6 is another flow chart illustrating an exemplary embodiment of the method performed by a network node.

According to another exemplary embodiment, as FIG. 6 shows, the step 212 of determining the valid SRS resource index with the minimum allocated amount, for the selected downlink slot and SRS slot, based on a 1-symbol or multi-symbol SRS user, further comprises: step 212A, if more than one valid SRS resource indexes are found, selecting the SRS resource index which has minimum allocated amount of allocated SRS resources across all the downlink slots, wherein said downlink slots belong to the same SRS slot if there is more than one SRS slots; step 212B, if more than one SRS resource indexes satisfy the above condition, selecting the lowest SRS resource index. For example, in FIG. 4, since the indexes 0-47 in SRS slot 1 DI slot 3 are all valid, according to step 212A, calculate the number of allocated SRS resources of each valid index across all the downlink slot within SRS slot 1, that is: the number of allocated SRS resources of index 0, SRS slot 1 is: 0 (DI slot 0)+1 (DI slot 1)+0 (DI slot 2)+0 (DI slot 3)=1. Similarly, the number of allocated SRS resources of index 1, SRS slot 1 is: 0 (DI slot 0)+0 (DI slot 1)+0 (DI slot 2)+0 (DI slot 3)=0. The number of allocated SRS resources of index 2, SRS slot 1 is: 2 (DI slot 0)+0 (DI slot 1)+0 (DI slot 2)+0 (DI slot 3)=2. The number of allocated SRS resources of index 3, SRS slot 1 is: 0 (DI slot 0)+0 (DI slot 1)+0 (DI slot 2)+0 (DI slot 3)=0. The number of allocated SRS resources of all the indexes are calculated in this way. According to the calculation, at least index 1 and index 3 of SRS slot 1 DI slot 3 have the minimum number of allocated SRS resources 0. Of course, the number of allocated SRS resources of other indexes in SRS slot 1 may also be 0, but the calculations are omitted here. Thus index 1 and index 3 of SRS slot 1 DI slot 3 both have the minimum number of allocated SRS resources. According to step 212B, index 1 of SRS slot 1 DI slot 3 is selected.

According to another embodiment, the step 212 of determining the valid SRS resource index or indexes with the minimum allocated amount, based on a 1-symbol or multi-symbol SRS user, further comprises: determining all SRS resource indexes for a 1-symbol SRS user, such as 1T1R UE, 2T2R UE and 4T4R UE as valid; determining major SRS resource indexes for a multi-symbol SRS user, such as 1T2R UE, 1T4R UE and 2T4R UE as valid, wherein the major SRS resource indexes are those SRS resource indexes which can be assigned as the symbol to send an SRS resource.

Figure 7:
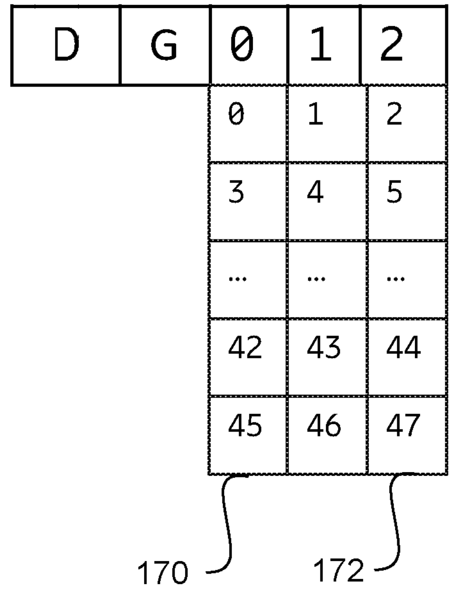
FIG. 7 is a schematic block diagram of another example of the AP-SRS resource map.

FIG. 7 shows examples of major SRS resource indexes. It also shows example of paired SRS resource indexes. Paired SRS resource is the resource of the SRS symbol which can be assigned as the symbol to send the SRS resource set other than the major SRS resource. Assume that the offset between the major resource symbol and the paired resource symbol $sym_{offset}$ is 2. The major resource indexes are {0, 3, 6, 9, . . . , 39, 42, 45} as column 170 shows, and the paired resource indexes are {2, 5, 8, 11, . . . , 41, 44, 47} as column 172 shows.

For a 1-symbol SRS user, such as 1T1R UE, 2T2R UE and 4T4R UE, only one SRS resource index needs to be determined. For a multi-symbol SRS user, such as a 2-symbol SRS user 1T2R UE, 1T4R UE and 2T4R UE, a major SRS resource index $R_{SRS}$ needs to be determined, then a paired SRS resource index $R_{paired}$ is also determined. $R_{paired}=Rsrs+sym_{offset}$. The multi-symbol SRS user will be allocated both the major SRS resource index and the paired SRS resource index or indexes. For multi-symbol SRS user which has three or more symbols, more than one paired SRS resource indexes will be allocated, wherein the paired SRS resources have different $sym_{offset}$, e.g., 2 and 4, etc.

According to another exemplary embodiment, the method further comprises: updating 216 the resource map after allocating 214 the SRS resource with the determined valid SRS resource index, wherein the count of the allocated valid SRS resource index is increased by one in the resource map.

According to another exemplary embodiment, the method further comprises: obtaining 218 the allocated SRS resource index from the resource map when the UE leaves a current serving cell, releasing 220 the SRS resource by decreasing the count of allocated valid SRS resource index by one in the resource map.

According to another exemplary embodiment, the network node 130 is an eNB or a gNB; the network node 130 is based on an Open Radio Access Network (O-RAN) standard; the network node 130 is part of a cloud based network.

Figure 8:
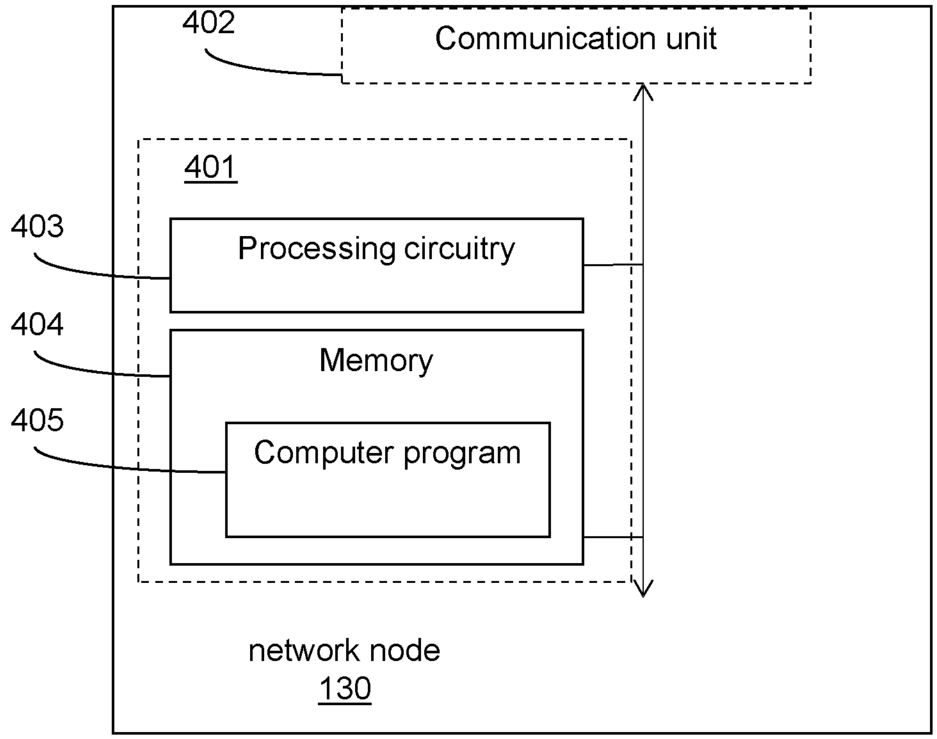
FIG. 8 is a block diagram illustrating a network node in more detail, according to further exemplary embodiments.

FIG. 8, in conjunction with FIG. 2, describes a network node 130 operable in a RAN 100 and configured for directing wireless signals towards a number of wireless devices 140. The network node 130 comprises multiple antennas. The network node 130 further comprises a processing circuitry 403 and a memory 404. Said memory contains instructions executable by said processing circuitry 403, whereby the network node 130 is operative for transmitting radio signals towards the number of wireless devices 140 through the multiple antennas. The network node 130 is further operative for receiving radio signals from the number of wireless devices 140, 145.

According to an exemplary embodiment, the network node 130 is further operative for: creating a multiple dimension resource map for SRS resources, such as downlink slots, SRS slots and SRS resource indexes, wherein each SRS resource index having a corresponding count, indicating the allocated amount of corresponding SRS resource index; counting the number of the allocated SRS resources for each downlink slot, across all the SRS slots; selecting the downlink slot which has the minimum number of allocated SRS resources, across all the SRS slots; counting the number of the allocated resources for each SRS slot, across all the downlink slots for each SRS slot, respectively; selecting the SRS slot which has the minimum allocated SRS resources; determining a valid SRS resource index or indexes with minimum allocated amount, for the selected downlink slot and SRS slot, based on 1-symbol or multi-symbol SRS user; allocating SRS resource having the valid SRS resource index or indexes.

According to another exemplary embodiment, the network node 130 is operative for: if more than one valid SRS resource index is found, select the SRS resource index which has the minimum allocated amount across all the downlink slots, said downlink slots belonging to the same SRS slot if there is more than one SRS slot; and if more than one SRS resource index satisfies the above condition, select the lowest SRS resource index.

According to another exemplary embodiment, the network node 130 is further operative for determining all SRS resource indexes for a 1-symbol SRS user, such as 1T1R UE, 2T2R UE and 4T4R UE as valid; determining major SRS resource indexes for a multi-symbol SRS user, such as 1T2R, 1T4R and 2T4R as valid, wherein the major SRS resource indexes are those SRS resource indexes which can be assigned as the symbol to send an SRS resource.

According to another exemplary embodiment, the network node 130 is further operative for updating the resource map after allocating the SRS resource with the determined valid SRS resource index, wherein the count of the allocated valid SRS resource index is increased by one in the resource map.

According to another embodiment, the network node 130 is operative for obtaining the allocated SRS resource index from the resource map when the UE leaves a current serving cell; releasing the SRS resource by decreasing the count of the allocated valid SRS resource index by one in the resource map.

According to another embodiment, the network node 130 is an eNB or a gNB; the network node 130 is based on an O-RAN standard; the network node 130 is part of a cloud based network.

According to other embodiments, the network node 130 may further comprise a communication unit 402, which may be considered to comprise conventional means for wireless communication with the wireless devices 140, 145, such as a transceiver for wireless transmission and reception of signals. The instructions executable by said processing circuitry 403 may be arranged as a computer program 405 stored e.g. in said memory 404. The processing circuitry 403 and the memory 404 may be arranged in a sub-arrangement 401. The sub-arrangement 401 may be a micro-processor and adequate software and storage therefore, a Programmable Logic Device, PLD, or other electronic component(s)/processing circuit(s) configured to perform the method mentioned above. The processing circuitry 403 may comprise one or more programmable processors, application-specific integrated circuits, field programmable gate arrays or combinations of these adapted to execute instructions.

The computer program 405 may be arranged such that when its instructions are run in the processing circuitry, they cause the network node 130 to perform the steps described in any of the described exemplary embodiments of the network node 130 and its method. The computer program 405 may be carried by a computer program product connectable to the processing circuitry 403. The computer program product may be the memory 404, or at least arranged in the memory. The memory 404 may be realized as for example a RAM (Random-access memory), ROM (Read-Only Memory) or an EEPROM (Electrical Erasable Programmable ROM). In some embodiments, a carrier may contain the computer program 405. The carrier may be one of an electronic signal, an optical signal, an electromagnetic signal, a magnetic signal, an electric signal, a radio signal, a microwave signal, or computer readable storage medium. The computer-readable storage medium may be e.g., a CD, DVD or flash memory, from which the program could be downloaded into the memory 404. Alternatively, the computer program may be stored on a server or any other entity to which the network node 130 has access via the communication unit 402. The computer program 405 may then be downloaded from the server into the memory 404.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." Further, the term "a number of", such as in "a number of wireless devices" signifies one or more devices. All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a network node of a Radio Access Network, RAN, for allocating resources for an APeriodic Sounding Reference Signal, AP-SRS, the RAN comprising the network node and at least one User Equipment, UE, the method comprising:

creating a multiple dimension resource map for SRS resources, the SRS resources comprising downlink slots, SRS slots and SRS resource indexes, wherein each SRS resource index having a corresponding count, indicating the allocated amount of corresponding SRS resource index;

counting the number of the allocated SRS resources for each downlink slot, across all the SRS slots;

selecting the downlink slot which has the minimum number of allocated SRS resources, across all the SRS slots;

counting the number of the allocated resources for each SRS slot, across all the downlink slots for each SRS slot, respectively;

selecting the SRS slot which has the minimum allocated SRS resources;

determining a valid SRS resource index or indexes with minimum allocated amount, for the selected downlink slot and SRS slot, based on 1-symbol or multi-symbol SRS user; and allocating SRS resource having the valid SRS resource index or indexes.

2. The method as claimed in claim 1, wherein said determining of the valid SRS resource index with minimum allocated amount, for the selected downlink slot and SRS slot, based on 1-symbol or multi-symbol SRS user, further comprises:

if more than one valid SRS resource indexes are found, selecting the SRS resource index which has minimum allocated amount across all the downlink slots, wherein said downlink slots belong to the same SRS slot if there is more than one SRS slots; and if more than one SRS resource indexes satisfy the above condition, selecting the lowest SRS resource index.

3. The method as claimed in claim 2, wherein said determining of the valid SRS resource index or indexes with minimum allocated amount, based on 1-symbol or multi-symbol SRS user, further comprises:

determining all SRS resource indexes for a 1-symbol SRS user, such as comprising at least one of a one transmitter and one receiver, 1T1R, UE, a two transmitter and two receivers, 2T2R UE, and a four transmitters and four receivers, 4T4R, UE, as valid; and determining major SRS resource indexes1 for a multi-symbol SRS user comprising at least one of a one transmitter and two receivers, 1T2R, UE, a one transmitter and four receivers, 1T4R, UE and a two transmitters and four receivers, 2T4R, UE as valid, wherein the major SRS resource indexes are those SRS resource indexes which can be assigned as the symbol to send an SRS resource.

4. The method as claimed in claim 1, wherein said method further comprises:

updating the resource map after allocating the SRS resource with the determined valid SRS resource index, wherein increasing the count of allocated valid SRS resource index by one in the resource map.

5. The method as claimed in claim 1, wherein said method further comprises:

obtaining the allocated SRS resource index from the resource map when the UE leaves a current serving cell, and releasing the SRS resource by decreasing the count of allocated valid SRS resource index by one in the resource map.

6. The method as claimed in claim 1, wherein said network node is an eNB or a gNB.

7. The method as claimed in claim 6, wherein said network node is based on an Open Radio Access Network, O-RAN, standard.

8. The method as claimed in claim 6, wherein said network node is part of a cloud based network.

9. A network node operable in a Radio Access Network, RAN, and configured for allocating resources for an APeriodic Sounding Reference Signal, AP-SRS, the network node comprising multiple antennas, a processing circuitry and a memory, said memory containing instructions which when executed by the processing circuitry cause the network node to:

create a multiple dimension resource map for SRS resources, the SRS resources comprising downlink slots, SRS slots and SRS resource indexes, wherein each SRS resource index having a corresponding count, indicating the allocated amount of corresponding SRS resource index;

count the number of the allocated SRS resources for each downlink slot, across all the SRS slots;

select the downlink slot which has the minimum number of allocated SRS resources, across all the SRS slots;

count the number of the allocated resources for each SRS slot, across all the downlink slots for each SRS slot, respectively;

select the SRS slot which has the minimum allocated SRS resources;

determine a valid SRS resource index or indexes with minimum allocated amount, for the selected downlink slot and SRS slot, based on 1-symbol or multi-symbol SRS user; and allocating the SRS resource having the valid SRS resource index or indexes.

10. The network node as claimed in claim 9, wherein the network node is further caused to:

if more than one valid SRS resource indexes are found, select the SRS resource index which has minimum allocated amount across all the downlink slots, said downlink slots belong to the same SRS slot if there is more than one SRS slots; and if more than one SRS resource indexes satisfy the above condition, select the lowest SRS resource index.

11. The network node as claimed in claim 10, wherein the network node is further caused to:

determine all SRS resource indexes for a 1-symbol SRS user comprising at least one of a one transmitter and one receiver, 1T1R, UE, a two transmitters and two receivers, 2T2R, UE and a four transmitters and four receivers, 4T4R, UE as valid; and determine major SRS resource indexes for a multi-symbol SRS user comprising at least one of a one transmitter and two receivers, 1T2R, UE, a one transmitter and four receivers, 1T4R, UE and a two transmitters and four receivers, 2T4R, UE as valid, wherein the major SRS resource indexes are those SRS resource indexes which can be assigned as the symbol to send an SRS resource.

12. The network node as claimed in claim 9, wherein said network node is further caused to:

update the resource map after allocating the SRS resource with the determined valid SRS resource index, wherein increasing the count of allocated valid SRS resource index by one in the resource map.

13. The network node as claimed in claim 9, wherein said network node is further caused to:

obtain the allocated SRS resource index from the resource map when the UE leaves a current serving cell, and release the SRS resource by decreasing the count of allocated valid SRS resource index by one in the resource map.

14. The network node as claimed in claim 9, network node is an eNB or a gNB.

15. The network node as claimed in claim 14 wherein said network node is based on an Open Radio Access Network, O-RAN, standard.

16. The network node as claimed in claim 14, wherein said network node is part of a cloud-based network.

17. A computer program product comprising instructions stored on a non-transitory memory, which, when executed by at least one processing circuitry of a network node of Radio Access Network, RAN, configured for allocating resources for an APeriodic Sounding Reference Signal, AP-SRS, the network node comprising multiple antennas, causes the network node to perform operations comprising:

create a multiple dimension resource map for SRS resources, the SRS resources comprising downlink slots, SRS slots and SRS resource indexes, wherein each SRS resource index having a corresponding count, indicating the allocated amount of corresponding SRS resource index;

count the number of the allocated SRS resources for each downlink slot, across all the SRS slots;

select the downlink slot which has the minimum number of allocated SRS resources, across all the SRS slots;

count the number of the allocated resources for each SRS slot, across all the downlink slots respectively for each SRS slot;

select the SRS slot which has the minimum allocated SRS resources;

determine a valid SRS resource index or indexes with minimum allocated amount, for the selected downlink slot and SRS slot, based on 1-symbol or multi-symbol SRS user; and allocate SRS resource having the valid SRS resource index or indexes.

18. A non-transitory computer readable medium including program code to be executed by processing circuitry of a network node, whereby execution of the program code causes the program code to perform operations comprising:

create a multiple dimension resource map for SRS resources, the SRS resources comprising downlink slots, SRS slots and SRS resource indexes, wherein each SRS resource index having a corresponding count, indicating the allocated amount of corresponding SRS resource index;

count the number of the allocated SRS resources for each downlink slot, across all the SRS slots;

select the downlink slot which has the minimum number of allocated SRS resources, across all the SRS slots;

count the number of the allocated resources for each SRS slot, across all the downlink slots respectively for each SRS slot;

select the SRS slot which has the minimum allocated SRS resources;

determine a valid SRS resource index or indexes with minimum allocated amount, for the selected downlink slot and SRS slot, based on 1-symbol or multi-symbol SRS user; and allocate SRS resource having the valid SRS resource index or indexes.

19. The non-transitory computer readable medium of claim 18, wherein said determine the valid SRS resource index or indexes with minimum allocated amount, for the selected downlink slot and SRS slot, based on 1-symbol or multi-symbol SRS user, further comprises:

if more than one valid SRS resource indexes are found, select the SRS resource index which has minimum allocated amount across all the downlink slots, wherein said downlink slots belong to the same SRS slot if there is more than one SRS slots; and if more than one SRS resource indexes satisfy the above condition, select the lowest SRS resource index.

20. The non-transitory computer readable medium of claim 18, wherein said find the valid SRS resource index or indexes with minimum allocated amount, based on 1-symbol or multi-symbol SRS user, further comprises:

determine all SRS resource indexes for a 1-symbol SRS user comprising at least one of a one transmitter and one receiver, 1T1R, UE, a two transmitters and two receivers, 2T2R, UE and a four transmitters and four receivers, 4T4R, UE as valid; and determine major SRS resource indexes1 for a multi-symbol SRS user comprising at least one of a one transmitter and two receivers, 1T2R, UE, a one transmitter and four receivers, 1T4R, UE and a two transmitters and four receivers, 2T4R, UE as valid, wherein the major SRS resource indexes are those SRS resource indexes which can be assigned as the symbol to send an SRS resource.

* * * * *